(12) United States Patent
Chen

(10) Patent No.: US 9,134,758 B2
(45) Date of Patent: Sep. 15, 2015

(54) CONNECTING MECHANISM AND ELECTRONIC DEVICE USING THE SAME

(71) Applicants:Fu Tai Hua Industry (Shenzhen) Co., Ltd., Shenzhen (CN); HON HAI PRECISION INDUSTRY CO., LTD., New Taipei (TW)

(72) Inventor: Zhou Chen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 198 days.

(21) Appl. No.: 13/973,989

(22) Filed: Aug. 22, 2013

(65) Prior Publication Data

US 2014/0185211 A1     Jul. 3, 2014

(30) Foreign Application Priority Data

Dec. 27, 2012   (CN) .......................... 2012 1 0577730

(51) Int. Cl.
*G06F 1/16*        (2006.01)

(52) U.S. Cl.
CPC ............ *G06F 1/1624* (2013.01); *G06F 1/1616* (2013.01); *Y10T 403/32057* (2015.01)

(58) Field of Classification Search
CPC ........................ A47B 21/03; A47B 2021/0364
USPC ..................................................... 361/679.08
See application file for complete search history.

(56) References Cited

U.S. PATENT DOCUMENTS

| | | | | |
|---|---|---|---|---|
| 4,718,740 A * | 1/1988 | Cox | ............................ | 312/223.2 |
| 5,062,609 A * | 11/1991 | Hames et al. | ................... | 248/676 |
| 5,262,762 A * | 11/1993 | Westover et al. | .............. | 345/168 |
| 5,539,615 A * | 7/1996 | Sellers | ...................... | 361/679.12 |
| 5,629,832 A * | 5/1997 | Sellers | ...................... | 361/679.55 |
| 5,673,169 A * | 9/1997 | Wicks | ......................... | 361/679.4 |
| 6,189,849 B1 * | 2/2001 | Sweere et al. | .............. | 248/286.1 |
| 6,233,138 B1 * | 5/2001 | Osgood | ..................... | 361/679.05 |
| 6,480,372 B1 * | 11/2002 | Vong et al. | ................. | 361/679.09 |
| 6,665,175 B1 * | 12/2003 | deBoer et al. | ............. | 361/679.06 |
| 6,667,759 B2 * | 12/2003 | Gerszberg et al. | ........... | 348/14.01 |
| 6,704,193 B2 * | 3/2004 | Vathulya | ................... | 361/679.15 |
| 6,827,409 B2 * | 12/2004 | Michael | ...................... | 312/223.3 |
| 6,836,404 B2 * | 12/2004 | Duarte | ...................... | 361/679.09 |
| 6,956,735 B2 * | 10/2005 | Lee et al. | ................... | 361/679.06 |
| 7,158,373 B2 * | 1/2007 | Smith | ........................ | 361/679.18 |
| 7,362,310 B2 * | 4/2008 | Wilk et al. | ..................... | 345/168 |
| D589,957 S * | 4/2009 | Reger et al. | ................... | D14/371 |
| 7,633,745 B2 * | 12/2009 | Sakakibara et al. | ...... | 361/679.11 |
| D611,046 S * | 3/2010 | Smith et al. | .................. | D14/331 |

(Continued)

*Primary Examiner* — Adrian S Wilson
(74) *Attorney, Agent, or Firm* — Novak Druce Connolly Bove + Quigg LLP

(57) ABSTRACT

A connecting mechanism for connecting a first unit and a second unit together is illustrated. The connecting mechanism includes a first linkage bar, a second linkage bar for being coupled to the first unit, and a third linkage bar for being slidably connected to the second unit. The first linkage bar includes a first end with a latching protrusion and an opposite second end. The second linkage bar includes a third end, an opposite fourth end, and a number of teeth. The first end is slidably connected to the second linkage bar. The latching protrusion is configured to selectively interlock with any one of the teeth of the second linkage bar. The third linkage bar includes a fifth end pivotally connected to the second end of the first linkage bar and a sixth end pivotally connected to the fourth end of the second linkage bar.

14 Claims, 8 Drawing Sheets

(56) References Cited

U.S. PATENT DOCUMENTS

| | | | |
|---|---|---|---|
| D611,047 S * | 3/2010 | Smith et al. | D14/331 |
| D614,181 S * | 4/2010 | Smith et al. | D14/331 |
| 8,320,113 B2 * | 11/2012 | Xiao | 361/679.27 |
| D700,178 S * | 2/2014 | Ma | D14/331 |
| 2003/0107871 A1 * | 6/2003 | Vathulya | 361/681 |
| 2007/0217135 A1 * | 9/2007 | Chuang et al. | 361/681 |
| 2013/0148282 A1 * | 6/2013 | Chen | 361/679.08 |

* cited by examiner

CONNECTING MECHANISM AND ELECTRONIC DEVICE USING THE SAME

BACKGROUND

1. Technical Field

The present disclosure relates to a connecting mechanism for connecting a first unit to a second unit, and particular to an electronic device using the connecting mechanism.

2. Description of Related Art

Many electronic devices, such as mobile phones and notebook computers, have a main body and a display panel pivotally connected to the main body by a connecting mechanism. Though the connecting mechanism satisfies basic requirements, a new type of connecting mechanism is still needed for improvement.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
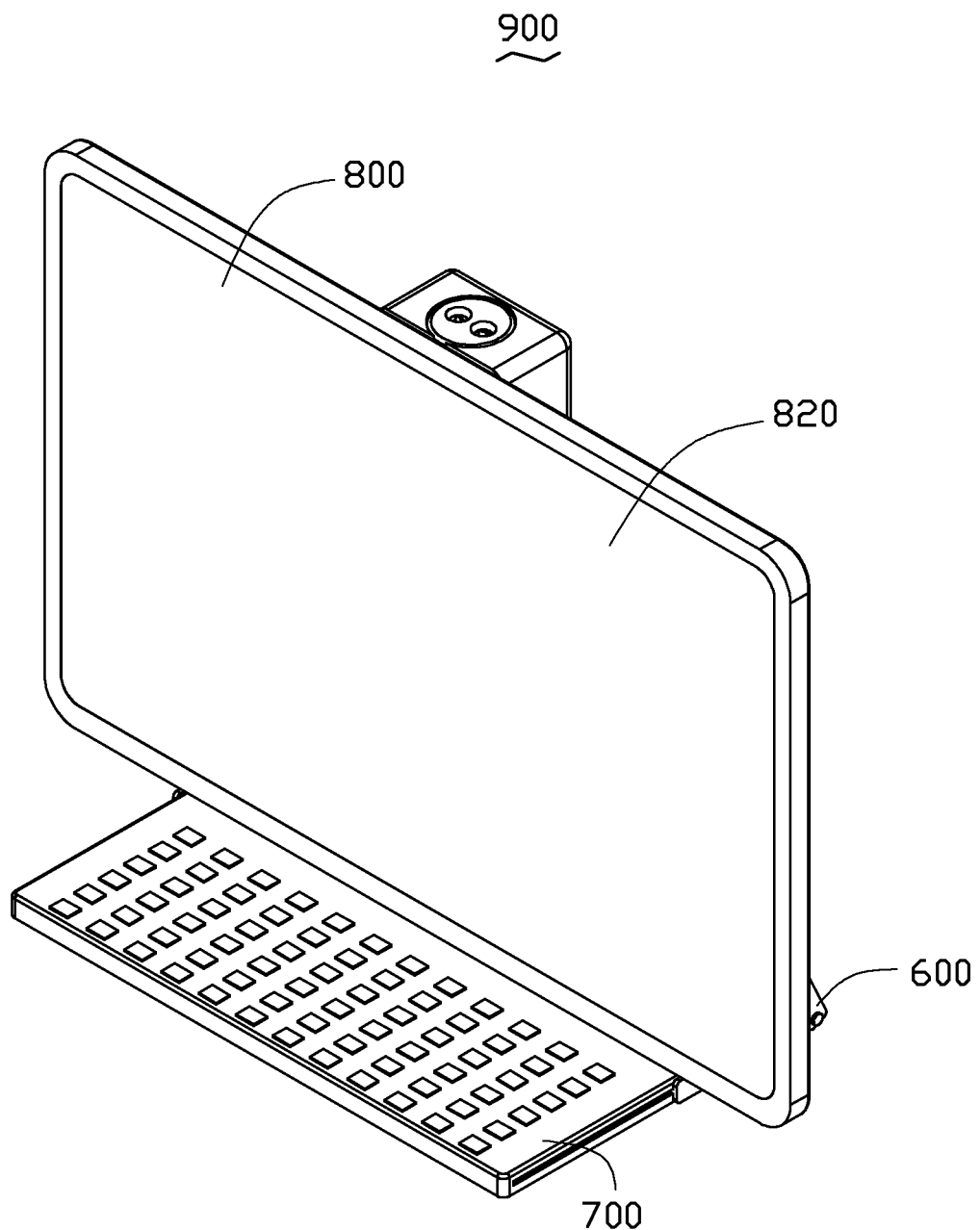
FIG. 1 is an isometric view of an electronic device according to an exemplary embodiment.
Figure 2:
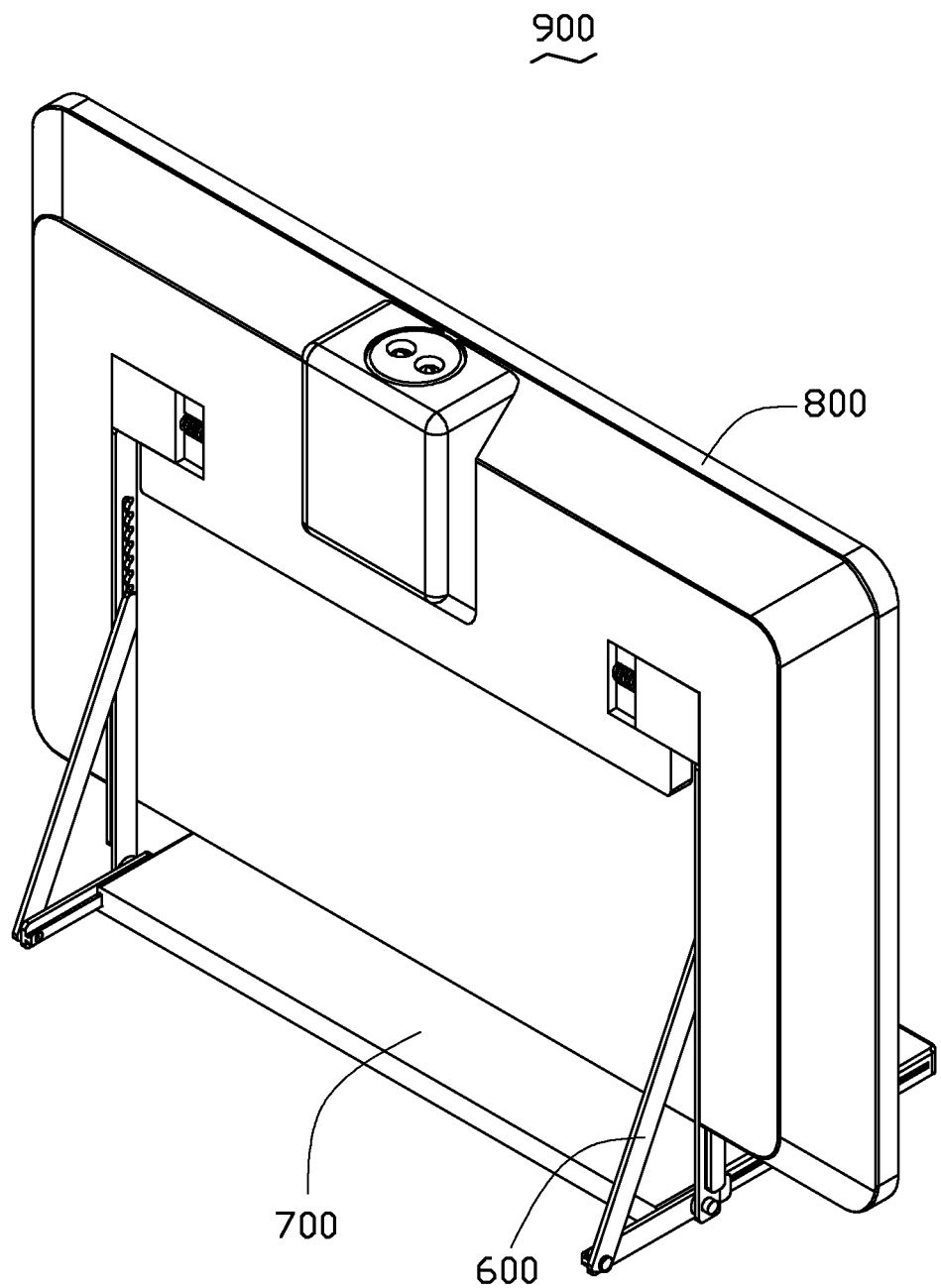
FIG. 2 is similar to FIG. 1, but viewed from a reverse perspective.

FIGS. 1 and 2 illustrate an electronic device 900 according to an exemplary embodiment. The electronic device 900 includes a first unit 800, a second unit 700, and a connecting mechanism 600 connecting the first unit 800 to the second unit 700. In the embodiment, the first unit 800 is an integrated personal computer, and the second unit 700 is a physical keyboard. In another embodiment, the first unit 800 may be a mobile phone, or an electronic book reading device.

Figure 3:
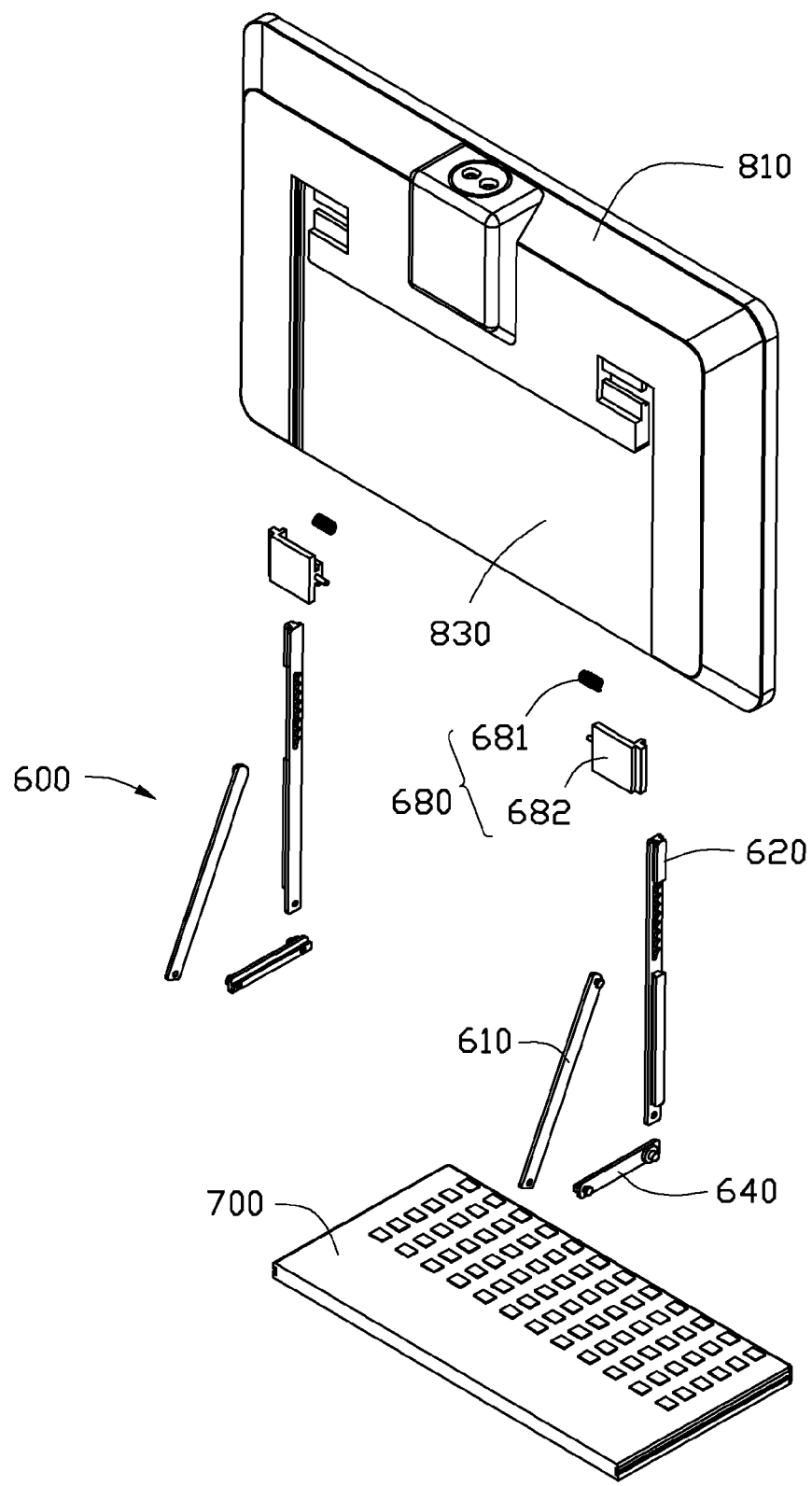
FIG. 3 is an exploded, isometric view of the electronic device of FIG. 2.
Figure 4:
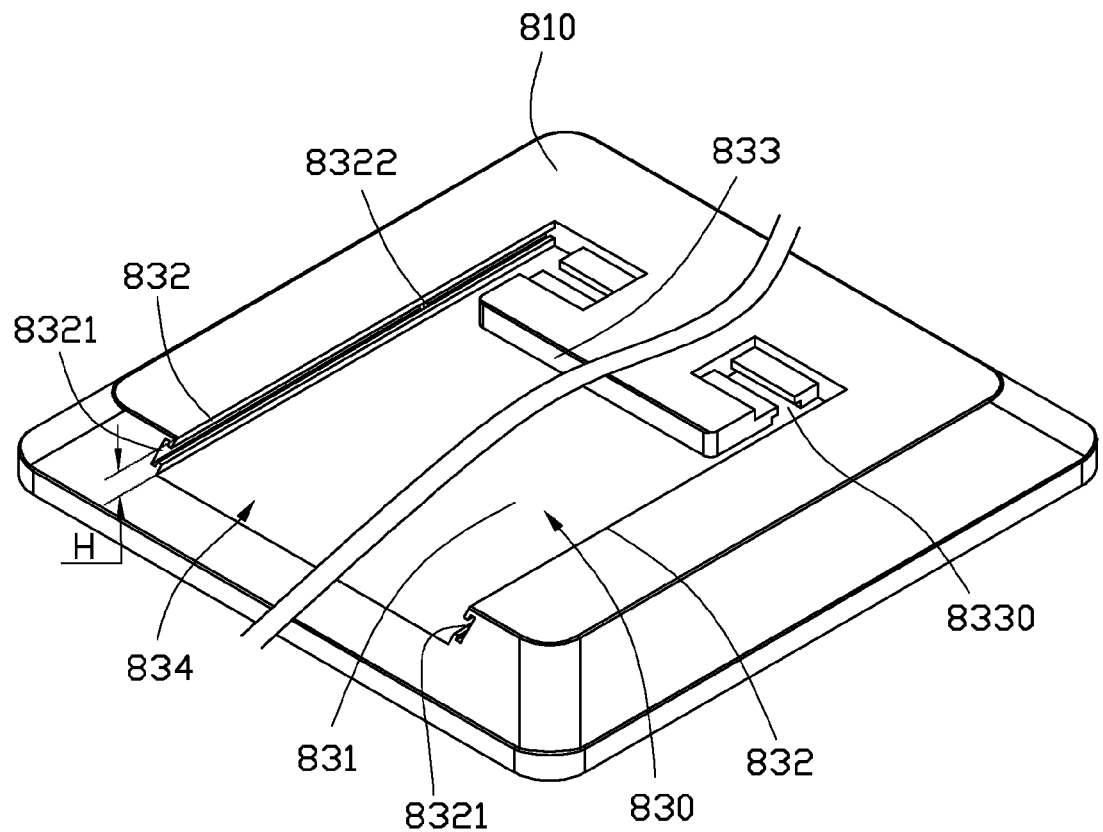
FIG. 4 is an isometric view of a first unit of the electronic device of FIG. 1.

FIGS. 3-4 show that the first unit 800 includes a housing 810. A display unit 820 is coupled to a front side of the housing 810. A rear side of the housing 810 defines a recess 830. The recess 830 includes a bottom 831, two opposite sidewalls 832 substantially perpendicular to the bottom 831, a mounting portion 833 protruding from the bottom 831, and an opening 834 opposite to the mounting portion 833. The sidewalls 832 each defines a first sliding groove 8321 facing toward each other. The first sliding grooves 8321 extend along a longitudinal direction of the sidewalls 832. In the embodiment, a cross-section of the first sliding groove 8321 is T-shaped. A stopper protrusion 8322 is formed in the first sliding groove 8321. In the embodiment, the stopper protrusion 8322 protrudes from a bottom of the first sliding groove 8321.

The mounting portion 833 is positioned between the two sidewalls 832. The mounting portion 833 defines two latching groove 8330. The extending direction of the latching groove 8330 is substantially perpendicular to the lengthwise direction of the sidewalls 832. In the embodiment, a cross-section of the latching groove 8330 is T-shaped.

Figure 5:
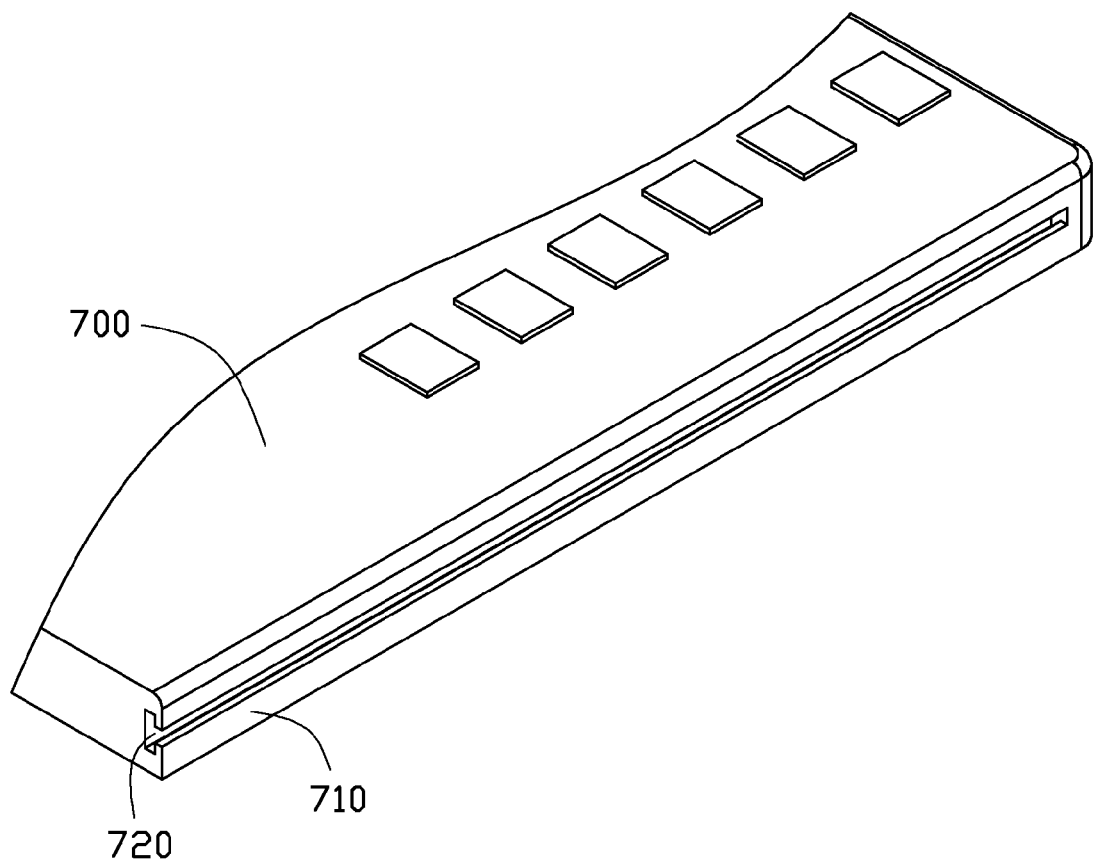
FIG. 5 is an isometric view of a second unit of the electronic device of FIG. 1.

FIG. 5 shows that the second unit 700 includes two opposite lateral surfaces 710 each defining a second sliding groove 720. In the embodiment, a cross-section of the second sliding groove 720 is T-shaped. A width between the two lateral surfaces 710 of the second unit 700 is slightly less than a width between the two sidewalls 832 of the housing 810. Thus, the second unit 700 is capable of sliding in or out the recess 830 through the opening 834. In the embodiment, a thickness of the second unit 700 is equal to or less than the depth of the recess 830.

Figure 6:
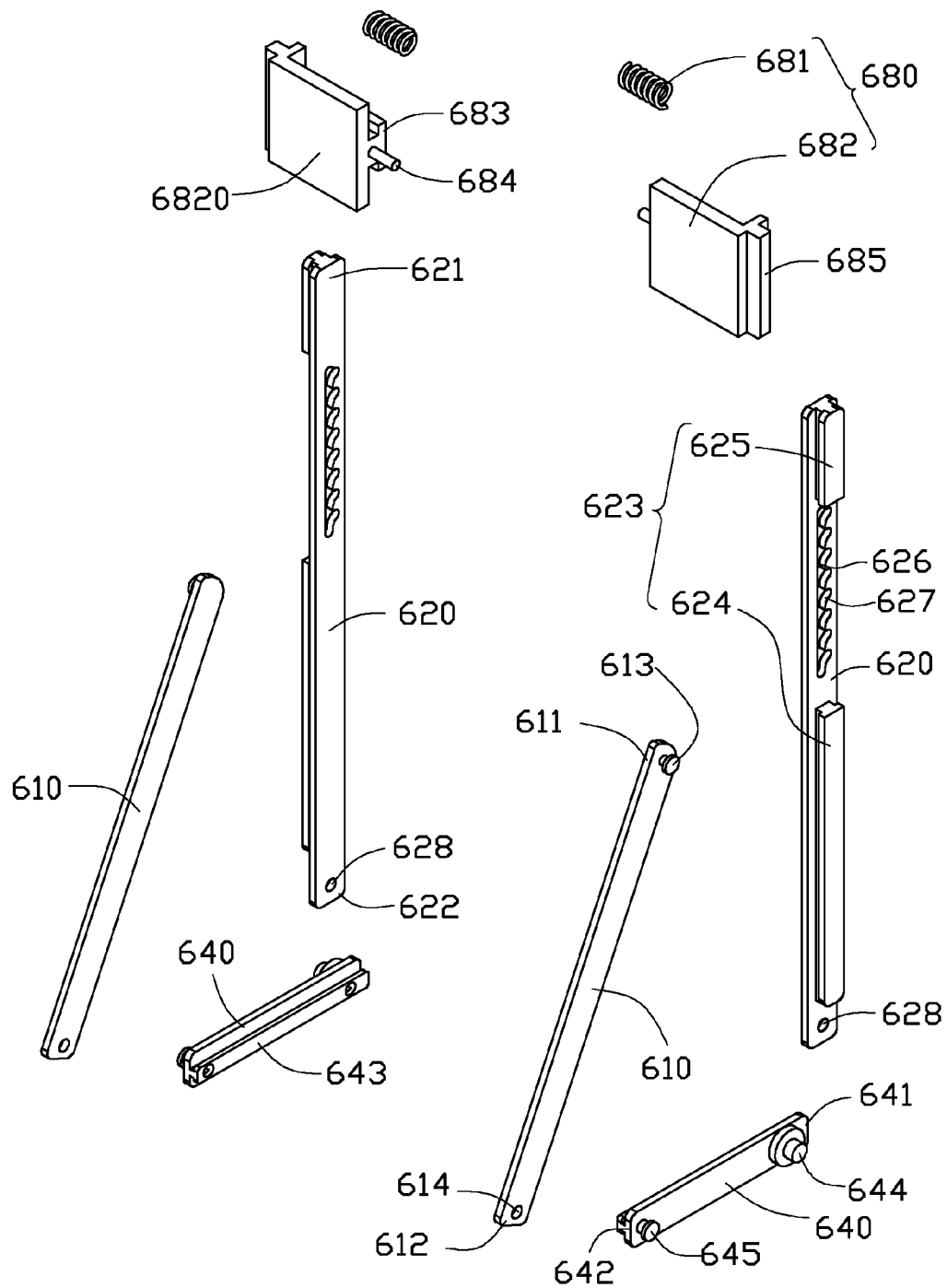
FIG. 6 is an exploded, isometric view of a connecting mechanism of the electronic device of FIG. 1.

FIG. 6 shows that the connecting mechanism 600 includes two first linkage bars 610, two second linkage bars 620, two third linkage bars 640, and two latching assemblies 680. Opposite ends of the third linkage bar 640 are pivotally connected to one end of the first linkage bar 610 and one end of the second linkage bar 620. The first linkage bar 610 is slidably connected to the second linkage bar 620. Then, the first linkage bar 610, the second linkage bar 640, and the third linkage bar 660 cooperatively form a variable triangular structure.

The first linkage bar 610 includes a first end 611 and an opposite second end 612. The first end 611 includes a latching protrusion 613 protruding from one side thereof. The second end 612 defines a shaft hole 614 extending therethrough.

The second linkage bars 620 each includes a third end 621, an opposite fourth end 622, and a first sliding rail 623 between the third end 621 and the fourth end 622. The first sliding rail 623 includes a lower portion 624 and an upper portion 625 extending along a longitudinal direction of the second linkage bar 620. The first sliding rail 623 is slidably received in the first sliding groove 8321 of the first unit 800. The stopper protrusion 8322 is positioned between the lower portion 624 and the upper portion 625, thereby blocking the upper portion 625 for preventing the second linkage bar 620 from disengaging from the first unit 800. The second linkage bar 620 defines a sliding slot 626 between the lower portion 624 and the upper portion 625, and includes a number of teeth 627 arranged inside the sliding slot 626. The latching protrusion 613 extends through the sliding slot 626 and is thus slidable in and along the sliding slot 626. The teeth 627 are successively connected one by one and capable of engaging the latching protrusion 613, thereby preventing the latching protrusion 613 from sliding with respect to the second linkage bar 620. The engagement between the latching protrusion 613 and different teeth 627 allows an orientation of the first unit 800 with respect to the second unit 700 to be adjusted. The fourth end 622 further defines a second shaft hole 628 extending therethrough. In another embodiment, the sliding slot 626 is omitted, and the teeth 627 are directly formed on a side surface of the second linkage bar 620.

The third linkage bars 640 each includes a fifth end 641 and an opposite sixth end 642. The third linkage bar 640 further includes a second sliding rail 643 between the fifth end 641 and the sixth end 642. The second sliding rail 643 extends along a longitudinal direction of the third linkage bar 640. The second sliding rail 643 is slidably received in the second sliding groove 720 of the second unit 700. Thus, the second unit 700 is slidable with respect to the third linkage bars 640.

The fifth end 641 includes a first shaft 644, and the sixth end 642 includes a second shaft 645. The first shaft 644 extends through the shaft hole 614 of the first linkage bar 610, thereby pivotally connecting the first linkage bar 610 to the third linkage bar 640. The second shaft 645 extends through the second shaft hole 628 of the second linkage bar 620, thereby pivotally connecting the second linkage bar 620 to the third linkage bar 640.

In the embodiment, the latching protrusion 613 is slidable to a position furthest away from the fourth end 622 where the first linkage bar 610, and the third linkage bar 640 are aligned with and juxtaposed alongside the second linkage bar 620. That is, the linkage bars 610, 620, and 640 are all parallel with each other and extend along the same direction.

The latching assemblies 680 each includes a resilient element 681 and a latching member 682. The latching member 682 includes a middle plate 6820, a sliding portion 683 connected to one side of the middle plate 6820, a positioning post 684 connected to one end of the middle plate 6820, and a latching portion 685 connected to the opposite end of the middle plate 6820. The sliding portion 683 is slidably received in the latching groove 8330 of the first unit 800. The resilient element 681 is compressible between the latching member 682 and the mounting portion 833. In the embodiment, the resilient element 681 is a coil spring sleeved around the positioning post 684 with opposite ends abutting against the sidewall 832 and the middle plate 6820.

Figure 7:
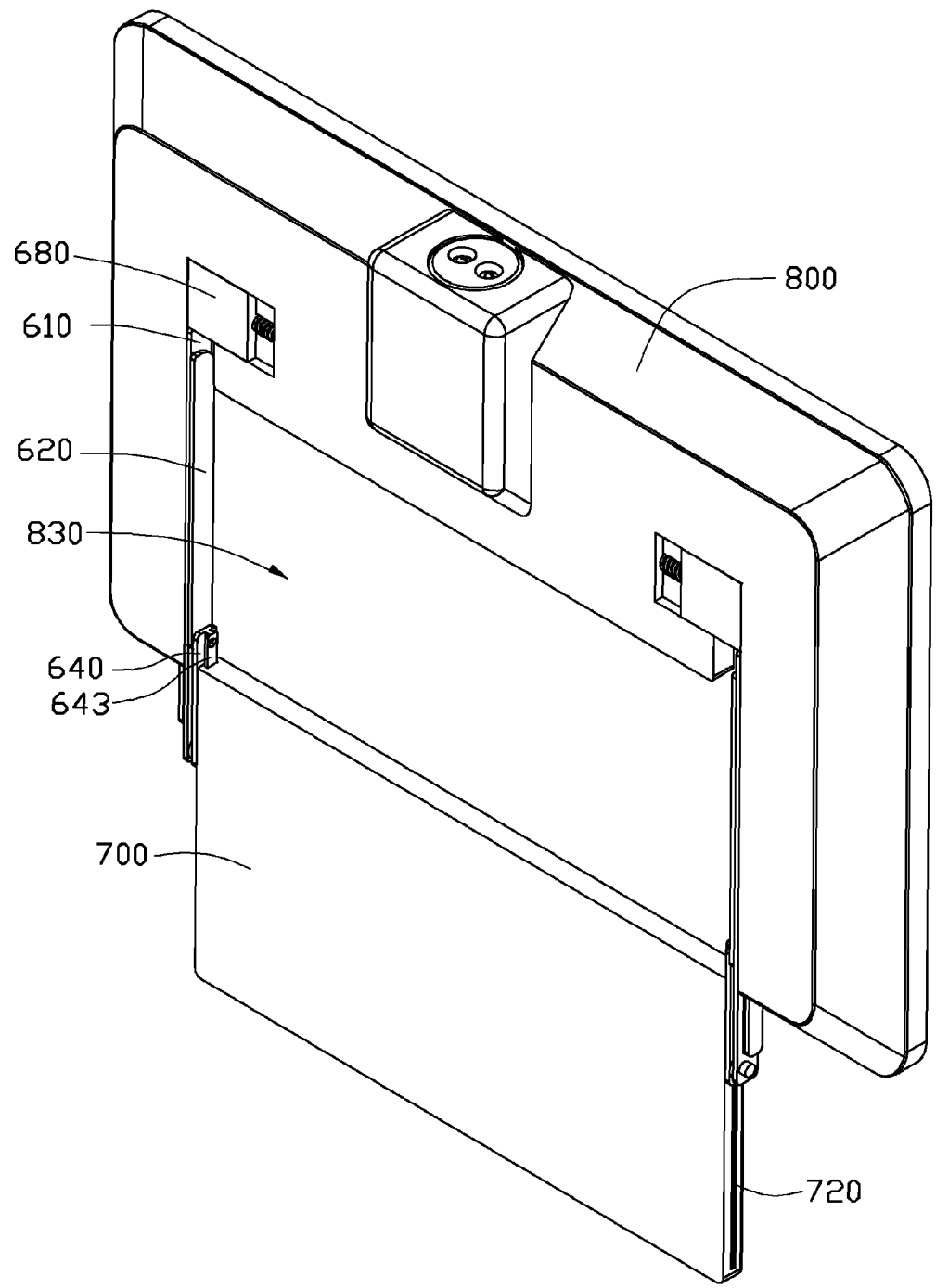
FIG. 7 is similar to FIG. 2, but showing the second unit aligned with a recess of the first unit.
Figure 8:
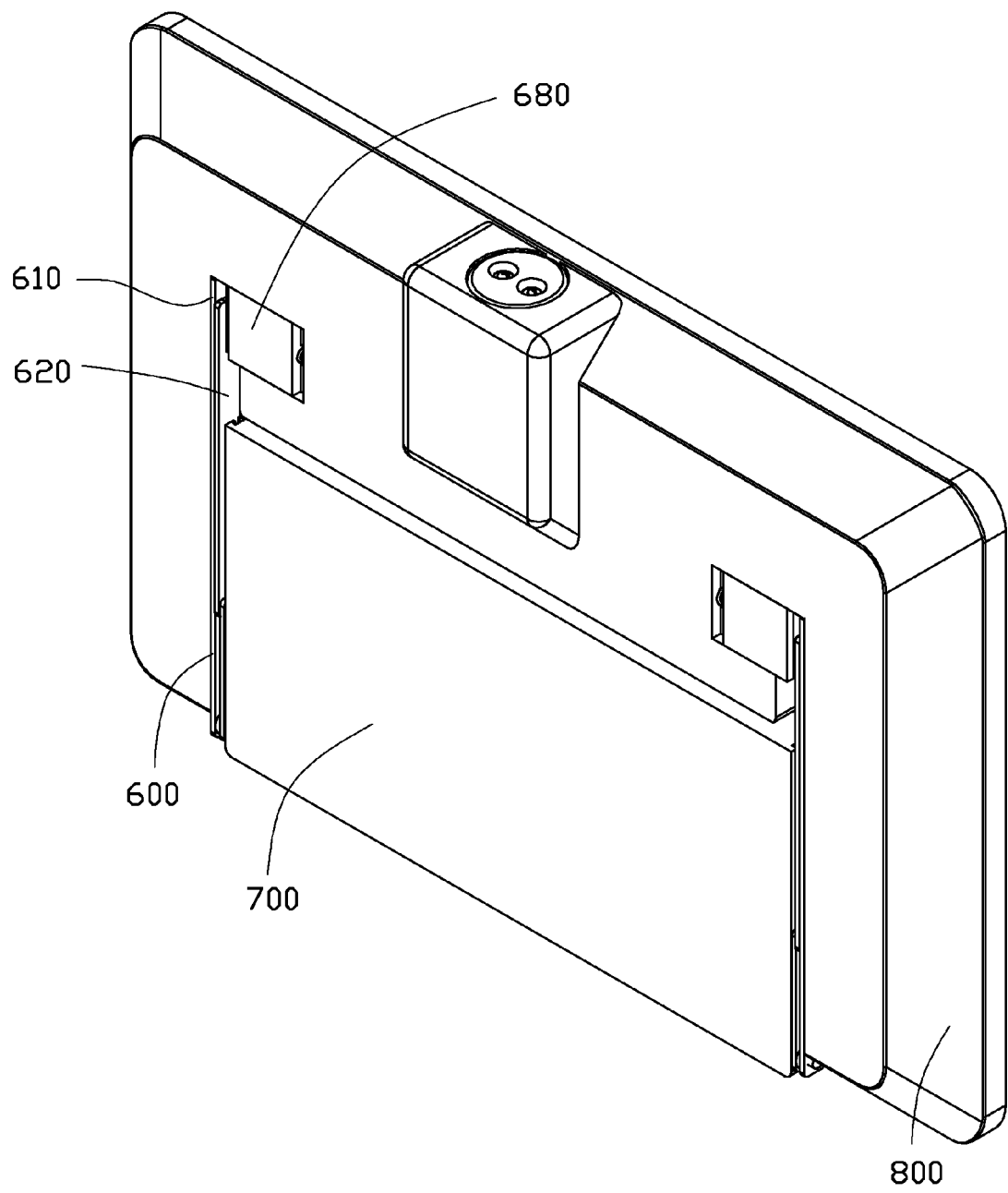
FIG. 8 is similar to FIG. 7, but showing the second unit received in the recess of the first unit.

FIGS. 7-8 show that when the second unit 700 is not in use, a user can move the second unit 700 to the back of the first unit 800. In the embodiment, a user can move the second unit 700 to cause the latching protrusion 613 to move from a lower position (e.g., the position of FIG. 2) to an upper position where the latching protrusion 613 engages a top tooth 627 of the second linkage bar 620. During the above process, the first linkage bar 610 and the third linkage bar 640 respectively pivot about the first shaft 644 and the second shaft 645, and are finally parallel to the second linkage bar 620, as shown in FIG. 7. Then, the second unit 700 is ready to be pushed into the recess 830 through the opening 834.

When the latching members 682 are moved from the position of FIG. 7 to the position of FIG. 8, the first linkage bars 610 and the second linkage bars 620 can thus inserted into the space between the latching member 682 and the sidewalls 832. When the latching members 682 are released, the resilient elements 681 rebound and the latching portions 685 abut against the first linkage bars 610 driven by the resilient elements 681, thereby retaining the first linkage bars 610 and the second linkage bars 620 within the recess 830, as shown in FIG. 8. After that, the second unit 700 can be pushed into the recess 830.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A connecting mechanism for connecting a first unit and a second unit together, the connecting mechanism comprising:
   at least one first linkage bar comprising a first end and an opposite second end, the first end comprising a latching protrusion;
   at least one second linkage bar configured to be coupled to a rear side of the first unit, the at least one second linkage bar comprising a third end, an opposite fourth end, and a plurality of teeth, wherein the first end is slidably connected to the at least one second linkage bar, and the latching protrusion is configured to selectively interlock with one of the plurality of teeth of the at least one second linkage bar, thereby obtaining a desired angular orientation of the first unit with respect to the second unit; and
   at least one third linkage bar configured to be slidably connected to the second unit, the at least one third linkage bar comprising a fifth end and a sixth end, the fifth end pivotally connected to the second end of the first linkage bar and the sixth end pivotally connected to the fourth end of the second linkage bar.

2. The connecting mechanism as described in claim 1, wherein the at least one second linkage bar defines a sliding slot extending along a longitudinal direction thereof, the plurality of teeth are arranged inside the sliding slot, and the latching protrusion extends through the sliding slot and is slidable in and along the sliding slot.

3. The connecting mechanism as described in claim 1, wherein the latching protrusion is slidable to a position furthest away from the fourth end where the at least one first linkage bar, and the at least one third linkage bar are aligned with and juxtaposed alongside the at least one second linkage bar.

4. An electronic device comprising:
   a first unit;
   a second unit; and
   a connecting mechanism comprising:
      at least one first linkage bar comprising a first end and an opposite second end, the first end comprising a latching protrusion;
      at least one second linkage bar configured to be coupled to a rear side of the first unit, the at least one second linkage bar comprising a third end, an opposite fourth end, and a plurality of teeth, wherein the first end is slidably connected to the at least one second linkage bar, and the latching protrusion is configured to selectively interlock with any one of the plurality of teeth of the at least one second linkage bar, thereby obtaining a desired angular orientation of the firs unit with respect to the second unit; and
      at least one third linkage bar configured to be slidably connected to the second unit and comprising a fifth end and a sixth end, the fifth end pivotally connected to the second end of the first linkage bar and the sixth end pivotally connected to the fourth end of the second linkage bar.

5. The electronic device as described in claim 4, wherein the second linkage bar defines a sliding slot extending along a longitudinal direction thereof, the plurality of teeth protrudes from one side of the sliding slot, and the latching protrusion extends through the sliding slot and is slidable in and along the sliding slot.

6. The electronic device as described in claim 4, wherein the latching protrusion is slidable to a position furthest away from the fourth end where the at least one first linkage bar, and the at least one third linkage bar are aligned with and juxtaposed alongside the at least one second linkage bar.

7. The electronic device as described in claim 6, wherein the first unit comprises a housing defining a recess, the recess comprising a bottom, at least one sidewall substantially perpendicular to the bottom, and an opening, the at least one second linkage bar is attached to the at least one sidewall and extends through the opening.

8. The electronic device as described in claim 7, wherein the at least one sidewall of the housing defines a first sliding groove extending along a longitudinal direction thereof, and the at least one second linkage bar comprises a first sliding rail slidably received in the first sliding groove.

9. The electronic device as described in claim 8, wherein the recess further comprises a mounting portion and at least one latching assembly, the mounting portion defines at least one latching groove toward the at least one sidewall, the at least one latching assembly is slidable along one of the at least one latching groove for abutting against the at least one first linkage bar when the at least one first linkage bar and the at least one second linkage bar are inserted into the space between the at least one latching assembly and the at least one sidewall.

10. The electronic device as described in claim 9, wherein the at least one latching assembly each comprises a resilient element and a latching member, the latching member comprises a middle plate, a sliding portion connected to one side of the middle plate, and a latching portion connected to an opposite end of the middle plate, the sliding portion is slidably received in the at least one latching groove of the first unit, and the resilient element is compressible between the latching member and the mounting portion.

11. The electronic device as described in claim 9, wherein an extending direction of the at least one latching groove is substantially perpendicular to the longitudinal direction of the at least one sidewall.

12. The electronic device as described in claim 7, wherein the second unit is slidable into the recess through the opening when the at least one first linkage bar, and the third linkage bar are aligned with and juxtaposed alongside the at least one second linkage bar.

13. The electronic device as described in claim 12, wherein the second unit defines at least one second sliding groove therein, and the at least one third linkage bar includes a second sliding rail slidably received in the at least one second sliding groove.

14. The electronic device as described in claim 4, wherein the first unit is an integrated personal computer with a display unit coupled to a front side thereof, and the second unit is a physical keyboard.

\* \* \* \* \*